United States Patent
Keeney et al.

(10) Patent No.: US 6,239,895 B1
(45) Date of Patent: May 29, 2001

(54) SCANNING APPARATUS AND METHOD EMPLOYING A LENS SPINNING ON AN AXIS NORMAL TO THE SCAN PLANE

(75) Inventors: Richard A. Keeney, Minneapolis; Farhad Nourbakhsh, Apple Valley, both of MN (US)

(73) Assignee: Electronics for Imaging, Inc., Foster City, CA (US)

(*) Notice: Subject to any disclaimer, the term of this patent is extended or adjusted under 35 U.S.C. 154(b) by 0 days.

(21) Appl. No.: 09/518,438

(22) Filed: Mar. 2, 2000

(51) Int. Cl.[7] .................................................. G02B 26/08
(52) U.S. Cl. ...................... 359/210; 359/900; 359/209; 348/202
(58) Field of Search ........................... 359/209–211, 204, 359/900; 358/474, 493, 494, 497, 296; 348/96–108, 201–202; 347/241, 244, 256, 258

(56) References Cited

U.S. PATENT DOCUMENTS 5,026,133 * 6/1991 Roddy et al. ........................ 359/210

* cited by examiner

Primary Examiner—James Phan
(74) Attorney, Agent, or Firm—Barry R. Lipsitz (57) ABSTRACT

One or more lenses are revolved around an axis normal to a flat scan plane to provide a scanning mechanism for exposure onto (or reading off of) a flat plane of a substrate. The data for the image is remapped electronically or in software to compensate for the curved path of the focal point of the scanning lens. Combined with a conventional scanning mechanism in a second axis, an area scan is accomplished inexpensively on a flat plane.

37 Claims, 5 Drawing Sheets

SCANNING APPARATUS AND METHOD EMPLOYING A LENS SPINNING ON AN AXIS NORMAL TO THE SCAN PLANE

BACKGROUND OF THE INVENTION

The present invention relates to an apparatus and method for scanning a substrate, namely photographic film or the like, whether scanning onto a substrate for image recording or scanning an image off of a substrate, i.e. input scanning. More particularly, the invention relates to a scanning lens which rotates on an axis normal to the scan plane. While the invention is described primarily as an image scanning lens for producing an image on a substrate, the invention can be employed in an input scanning device as well.

As used herein, the term "film" is intended to mean any type of image recording medium, including photographic film, thermal media, dye transfer media, photo-electro-static (xerographic) transfer surfaces, and the like, and is not to be construed only as photographic film.

Many imaging tasks such as recording an image onto film one pixel at a time or scanning an image off of film one pixel at a time require the ability to rapidly and accurately move the film and the imaging optics in relation to one another in a path that covers the area of the image. Conventional raster scan methods use straight lines of samples called scanlines spaced uniformly along a second axis. This is convenient for many devices such as CRT's and certainly is convenient for software and digital electronics where memory and coordinate systems are organized into rows and columns.

In a conventional film recorder, a light beam from a cathode ray tube ("CRT") or the like is controlled by a deflection system to scan across a stationary frame of photographic film to expose the film with an image. Typically, the images are generated by a computer for the production of slides, transparencies, photographs or the like. Alternatively, the images can comprise natural images acquired by a scanner or television camera for subsequent processing by a computer.

Known film recorders, such as those sold under the trademark SOLITAIRE® by Management Graphics, Inc. of Minneapolis, Minn., U.S.A., typically include a light source such as a CRT for producing a beam, a deflection system for scanning the beam across the face of the CRT, a system control and central processor unit ("CPU") for controlling the deflection system, and a camera (i.e., "film transport"). The later component may include a film transport body, lens, lens mounting assembly, aperture plate, film plate, and film transport mechanism. One type of film transport mechanism that is widely in use is a shuttle style film gate. Such transports are manufactured, for example, by Oxberry Corporation of Mamaroneck, N.Y., U.S.A.

On a Solitaire® film recorder, an image to be recorded is first written on the phosphor of the CRT by deflecting an electron beam in a raster pattern and modulating the intensity of the beam. This process is analogous to the creation of a television picture. Alternatively, the image can be written on the CRT using well known time modulation techniques, wherein the beam intensity is constant but the time the beam is kept at each point is varied depending on the exposure required.

The resulting pattern (the "object image") on the CRT is optically imaged onto photographic film by the film transport, which contains the required optics and mechanism to advance the film to successive frames. Other types of light sources can be substituted for the CRT in a film recorder. Examples include fiber optic sources, lasers and focused light impinging on the film or other substrate mounted on a rotating drum wherein one or more rotations are completed for each scan line.

When it comes to mechanically creating a repetitive motion that scans an image in a raster fashion, difficulties arise. Many systems have been designed in the past that utilize the advantages of circular or pivoting motions to accomplish the scanning task, but in order to maintain the row/column raster organization of the image data, additional complications such as holding the film in a curved shape or adding a field-flattening or f-theta lens to the system are introduced.

It would be very advantageous to provide a system that could utilize a circular scanning motion in the fastest scanning direction and yet maintain the simplicity of a flat image plane.

The present invention provides a scanning lens which rotates around an axis normal to the flat scan plane of the substrate to be scanned having the aforementioned and other advantages.

SUMMARY OF THE INVENTION

In accordance with the present invention, a scanning apparatus and method employing a lens spinning on an axis normal to the scan plane is presented for use in either exposing a recording medium with radiation such as a scanning beam from an imaging source or for recording an image from an image containing substrate, such as exposed film.

In one embodiment of the invention, a scanning lens is arranged in proximity to a substrate for passing radiation to the substrate. The lens is arranged in a spinner which is rotatable about an axis normal to a flat scan plane of the substrate. The spinner may be provided in any shape suitable for containing or holding the scanning lens, such as a circular disk or the like. The spinner may be spun by any means, for example a brush-less DC servo motor, ultrasonic drive, an air turbine, or the like. A transport mechanism is provided for driving the spinner in a direction substantially parallel to the substrate in order to allow scanning of different regions of the substrate via said lens. The substrate is maintained in a fixed position. A controller coordinates the driving and rotation of the spinner with the position of the light source. The spinner is positioned such that at least a portion of the substrate can be controllably scanned by the radiation which passes through the scanning lens.

A particular embodiment of the invention includes a processor for converting the image data between a first format of the substrate and a second format of the rotating scanning lens. The first format of the substrate may be a row and column raster format and the second format of the rotating scanning lens may be an angle and x-offset coordinate system format. The invention may be utilized with any other conventional imaging formats.

To prevent stray light from passing around the lens, the spinner may be opaque. Additional baffling may also be provided to prevent unwanted reflections from degrading optical performance and for increased light-tightness.

The light source may consist of one or more light emitting diodes, a laser, a fiber optic source, or a cathode ray tube. When recording or exposing an image onto the substrate, the light source intensity or duty cycle is modulated in intensity or duty cycle to produce the desired image on the substrate. The controller provides the modulation information for the light source synchronized to the motion of the spinner.

The controller controls the transport mechanism to provide progressive scanning of said substrate by said lens. To cover the entire area of the film, the rotation axis of the lens spinner is moved in some small increment substantially parallel to the film plane for each revolution. There are many well-known techniques for providing incremental motion along a straight line. The preferred embodiment incorporates a ball slide on a machined way with a stepper-motor and lead screw combination providing the driving force. The preferred direction of travel is generally along the centerline of the image between its shortest sides. Therefore, the transport mechanism may be adapted to transport the spinner to allow exposure of subsequent arc regions of the substrate.

In one embodiment of the invention, the lens scans the substrate in an arc which lies in a flat plane normal to the rotation axis of the lens. By rotating a lens around an axis parallel to its imaging axis, its focal point will trace an arc that lies in a flat plane that is normal to the rotation axis.

In another embodiment of the invention, a point light source such as an LED chip can be placed behind the rotating lens in a stationary position. The light source can be arranged along an axis normal to the center of the substrate.

Alternatively, the light source may be configured so that it tracks the movement of the incremental linear motion of the lens spinner axis in a direction substantially parallel to the substrate. In such a configuration, the light source may be moved along an axis of the lens at a time when the lens is centered on the substrate.

In another embodiment, the light source rotates with the rotation of the spinner.

The spinner in any embodiment may contain multiple lenses and the light source may comprise multiple light sources.

In a particular embodiment, the scanning lens is part of an image recorder, the substrate is a recording medium, such as film, and the light source comprises an imaging source. In such an embodiment the scanning lens allows for exposure of the recording medium to the radiation from the imaging source.

In a further embodiment, the scanning lens is part of an input scanning device for image recording. In this embodiment, the substrate contains an image and the scanning lens scans the image on the substrate with radiation from the light source. Reflectance or transmittance from the substrate is then measured by light detectors in the conventional manner.

In a further embodiment of the invention the scanning lens and light source remain stationary and the substrate is affixed to a rotatable spinner.

DETAILED DESCRIPTION OF THE INVENTION

In accordance with the present invention, a scanning apparatus and method employing a lens spinning on an axis normal to a flat scan plane is presented for use in either exposing a recording medium with radiation such as a scanning beam from an imaging source or for recording an image from an image containing substrate, such as exposed film.

Figure 1:
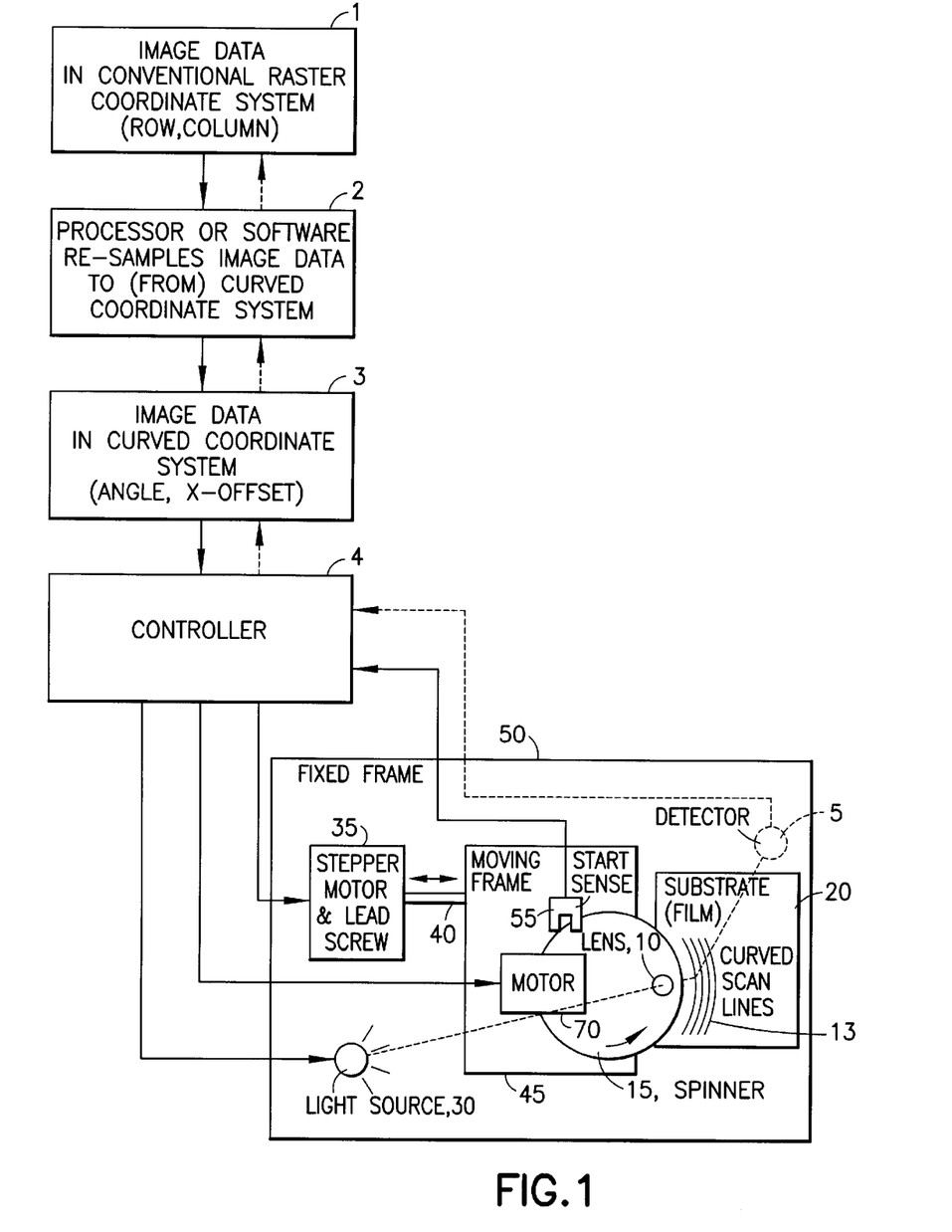
FIG. 1 is a simplified block diagram representation of the invention.

FIG. 1 shows a simplified block diagram of the invention. FIG. 1 will be described as a scanning system for exposing a substrate with radiation from an imaging source. However, the process can be reversed to accomplish input scanning for recording an image from an image containing substrate, as indicated by the dashed lines in FIG. 1. In FIG. 1, image data in a conventional row and column raster format (Box 1) is provided to a processor 2 which re-samples the image data from the conventional row and column raster format to an angle and x-offset coordinate system format (Box 3). This re-sampled data is then provided to a controller 4. A scanning lens 10 is arranged in proximity to a substrate 20 for passing radiation to the substrate 20 from the light source 30. The lens 10 is arranged in a spinner 15 which is rotatable about an axis normal to a flat scan plane of the substrate 20 by a spinner motor 70. The spinner 15 may be provided in any shape suitable for containing or holding the scanning lens 10, such as a circular disk or the like. The spinner is arranged within a moving frame 45. A transport mechanism comprising a stepper motor 35 and a lead screw 40 is provided for driving the moving frame 45 in a direction substantially parallel to the substrate 20 in order to allow scanning of different arc regions 13 of the substrate 20 via said lens 10. The stepper motor 35 and spinner motor 70 provide the scanning motion of the scanning lens 10.

When recording or exposing an image onto the substrate, the light source intensity or duty cycle is modulated in intensity or duty cycle to produce the desired image on the substrate. The controller 4 provides the modulation information for the light source 30 synchronized to the motion of the spinner 15 and controls the stepper motor 35 and the spinner motor 70 accordingly. The moving frame 45, the stepper motor 35, the light source 30, and the substrate 20 are all arranged on a fixed frame 50. A sensor 55 is provided to monitor the lens position and input lens position information into the controller 4.

The invention can also be employed as an input scanning device for recording an image from an image containing substrate. The above described process is reversed in an input scanning device. The dashed lines in FIG. 1 represent an input scanning device in which a light source 30 provides radiation to an image containing substrate 20 through a rotating lens 10. The portion of the light reflected off of the image is detected by a detector 5, which provides the image data in an angle and x-offset coordinate system format to the controller 4, which image information is then provided to the processor 2 which processes the image data into a conventional row and column raster format (Box 1) in order to reproduce the image.

Figure 2:
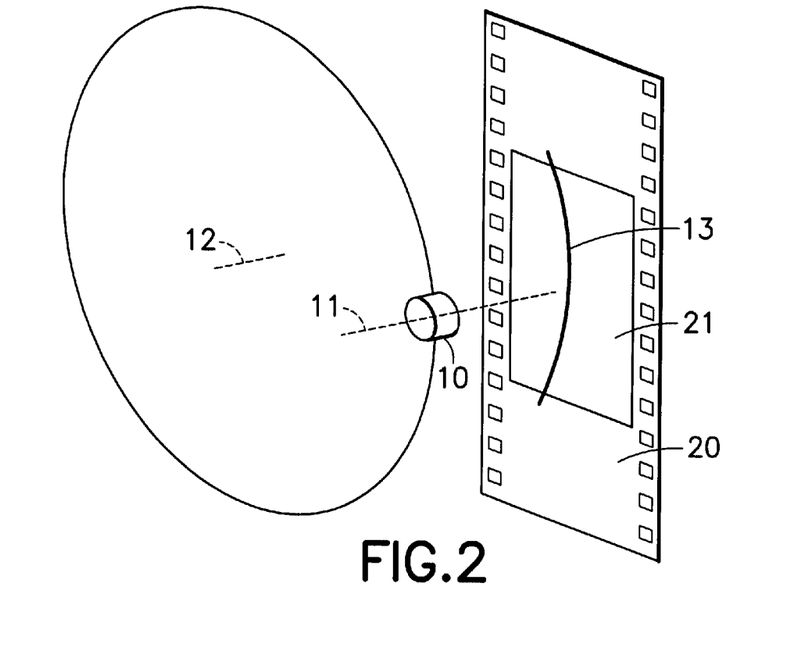
FIG. 2 is a representation of the lens alignment with the substrate.

FIG. 2 represents a simplified representation of the invention. A lens 10 having an axis 11 is provided which rotates around an axis of rotation 12. The lens axis 11 is parallel to the axis of rotation 12. The lens is arranged in proximity to a substrate 20 for passing radiation to the substrate. When the lens is rotated around axis 12 the focal point of the lens 10 will trace an arc 13 that lies in a flat plane 21 that is normal to the axis of rotation 12. The substrate, such as film or other image to be scanned, is placed on the plane 21 formed by the arc 13 which is traced by the focal point of the lens.

Figure 3:
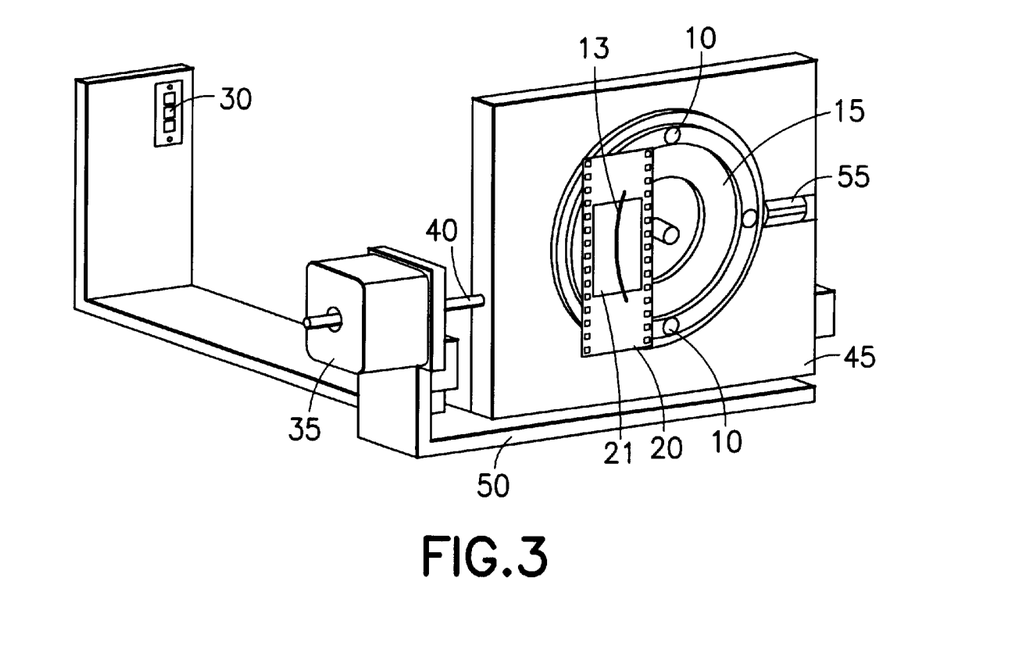
FIG. 3 is a perspective view of the apparatus in accordance with the present invention.

A particular embodiment of the invention is shown in FIG. 3. As reference numbers are consistent throughout all of the drawings, only those reference numbers essential to the description of the particular embodiment being discussed will be described to avoid duplication of subject matter.

In the embodiment shown in FIG. 3, a scanning lens 10 is arranged in proximity to a substrate 20 for passing radiation to the substrate 20 from a light source 30. The lens 10 is arranged in a spinner disk 15 which is rotatable about an axis normal to a flat scan plane 21 of the substrate 20. The disk is arranged within a moving frame 45. The disc 15 may be spun by any means, for example a brush-less DC servo motor, an ultrasonic drive, an air turbine, or the like. In the example shown in FIG. 5, a motor 70 is provided to enable rotation of the disk 15. A transport mechanism 35, 40 (shown in detail in FIG. 5) is provided for driving the moving frame 45 containing the disk 15 in a direction substantially parallel to the substrate 20 in order to allow scanning of different regions of the substrate via said lens 10.

In the embodiment shown in FIG. 3, the transport mechanism comprises a stepper motor 35 with an integrated lead screw nut mounted to a fixed frame 50. A lead screw 40 is shown connected to the moving frame 45 and engaging the lead screw nut in the motor 35.

The substrate 20 is maintained in a fixed position. A controller (not shown) coordinates the driving and rotation of the disk 15 with the position of the light source 30 through a sensor 55 which determines the position of the disk. The disk 15 is positioned such that at least a portion of the substrate 20 can be controllably scanned by the radiation which passes through the scanning lens 10 from the light source 30.

A particular embodiment of the invention includes a processor for converting the image data between a first format of the substrate and a second format of the rotating scanning lens. The first format of the substrate may be a row and column raster format and the second format of the rotating scanning lens may be an angle and x-offset coordinate system format. The invention may be utilized with any other conventional imaging formats.

To prevent stray light from passing around the lens 10, the disk 15 may be an opaque disk. Additional baffling may also be provided to prevent unwanted reflections from degrading optical performance and for increased light-tightness.

The light source 30 may consist of one or more light emitting diodes, a laser, a fiber optic source, or a cathode ray tube.

Figure 4:
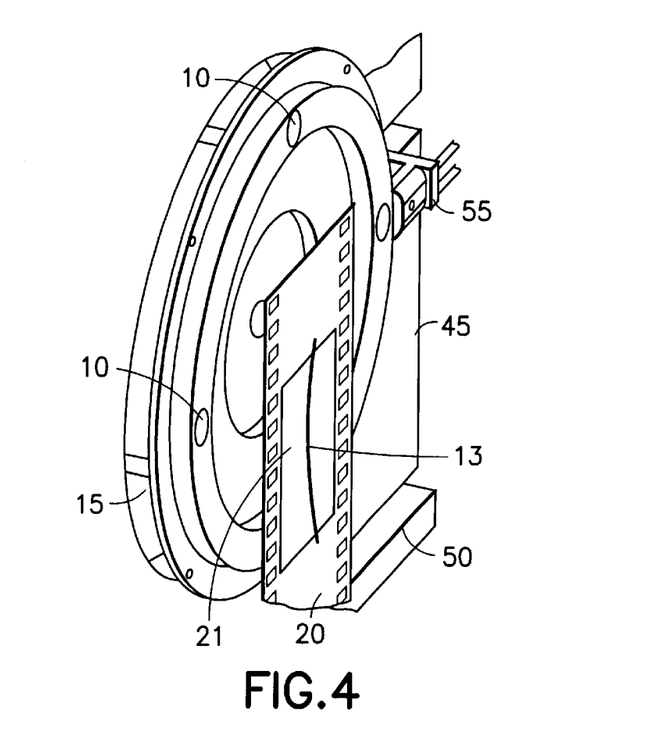
FIG. 4 is a perspective view of the rotatable disk-shaped spinner.

FIG. 4 shows a perspective view of the rotatable disk 15 containing the lens 10 arranged in proximity to the substrate 20. The disk 15 is shown in a moveable frame 45 and the substrate is shown attached to a fixed frame 50. As the lens 10 rotates the focal point of the lens 10 traces an arc 13 in the image plane 21 of the substrate 20 normal to the axis of rotation of the disk 15.

The controller controls the transport mechanism to provide progressive scanning of said substrate 20 by said lens 10. To scan over the entire area of the substrate 20, the rotation axis of the disk 15 is moved in some small increment substantially parallel to the scan plane 21 for each revolution. There are many well-known techniques for providing incremental motion along a straight line.

Figure 5:
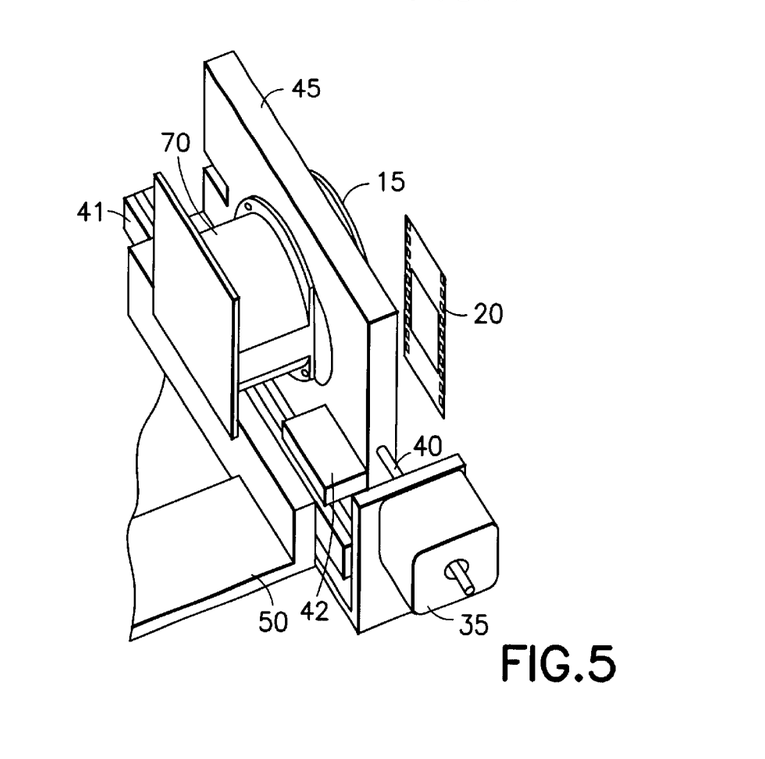
FIG. 5 is a perspective view of the transport mechanism.

The preferred embodiment of a transport mechanism is shown in detail in FIG. 5. In this embodiment, the transport mechanism incorporates a ball slide 42 on a machined way 41 with a stepper-motor 35 and lead screw 40 combination providing the driving force. The preferred direction of travel is generally along the centerline of the substrate 20 between its shortest sides. Therefore, the transport mechanism may be adapted to transport the spinner disk 15 to allow exposure of a subsequent arc region of the substrate 20.

In one embodiment of the invention, the lens 10 scans the substrate 20 in an arc 13 which lies in a flat plane 21 normal to the rotation axis 12 of the lens 10 (FIG. 2). By rotating a lens 10 around an axis 12 parallel to its imaging axis 11, its focal point will trace an arc 13 that lies in a flat plane 21 that is normal to the rotation axis 12.

In another embodiment of the invention, a point light source such as an LED chip can be placed behind the rotating lens in a stationary position. The light source can be arranged along an axis normal to the center of the substrate. Referring to FIG. 2, the image of this light source will follow an arc 13 determined by the radius of the lens axis 11 from the rotation axis 12 with an additional offset and radius depending on the light source position relative to the rotation axis 12 and the magnification ratio of the imaging lens 10.

A simple geometric ray trace from the light source through the center of the lens 10 to the point where it intersects the substrate 20 can be used to calculate the position of the image of the light source as a function of the angular position of the disk as it rotates:

With a coordinate system centered around the point where the rotation axis 12 intersects the image plane with Z being normal to the image plane, the position of the image formed by a point object (a light source or in inverse case, a sensor) positioned behind the lens is approximated by:

$$X_{image} = R^* \cos\phi(1+M) - M^* X_{source}.$$

$$Y_{image} = R^* \sin\phi(1+M) - M^* Y_{source}.$$

Where R=Radius of rotation of center of lens 10, and M approximates the nominal magnification of the lens 10 using $M=(Z_{lens}/(Z_{source}-Z_{lens}))$ It is a well-known technique in digital imaging to resample an image from one coordinate system to another. In this case, the processor re-samples from the Row and Column raster format that the data is supplied in to the Angle and X-Offset coordinate system of the scanning mechanism. In a crude implementation, the pixel value nearest to the calculated coordinate is simply used. To avoid undesired aliasing artifacts due to the re-sampling process, more refined (and also well-known) techniques of over-sampling and/or anti-alias filtering can be employed.

It is also well known that the re-sampling process can be accomplished in software on a general-purpose computer, or in dedicated electronics.

As discussed, the light source 30 can be positioned in a variety of positions with respect to the spinning lens. FIG. 3 shows the light source 30 fixed in position in relation to the image plane 21. This is the preferred embodiment since the mounting and any electrical or optical connections to the light source 30 do not have to deal with motion relative to the frame 50 of the mechanism. It is generally advantageous that the light source 30 be placed along an axis normal to the image plane 21 at its center to reduce the angle of coverage required by the spinning lens 10. The required angle of coverage would be half of the diagonal of the image divided by the light source distance from the image ($Z_{source}$).

Figure 6:
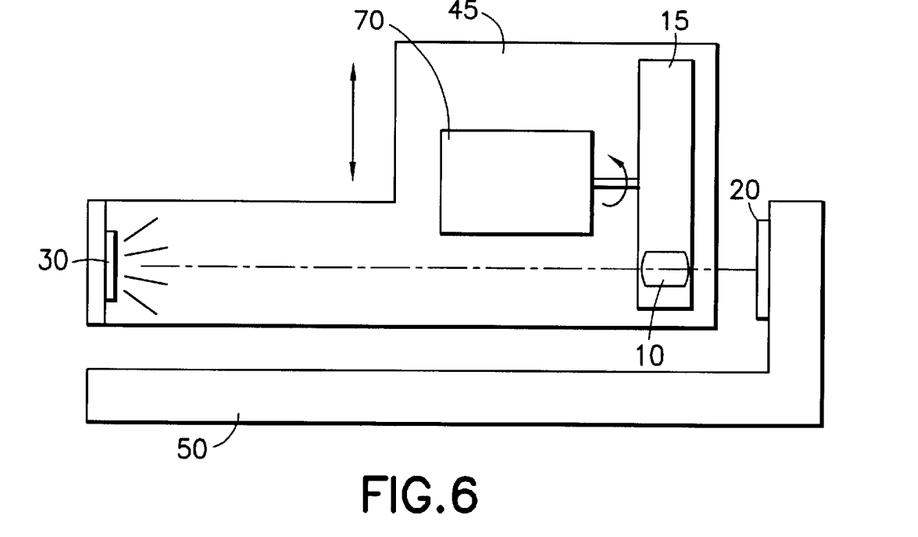
FIG. 6 shows a representative view of a further embodiment of the invention having a moveable light source.

In an alternative embodiment shown in FIG. 6, the light source 30 moves with the incremental linear motion of the lens spinner axis in a direction substantially parallel to the substrate 20, but is fixed in relation to the spinning of the disk. In the embodiment shown in FIG. 6, the light source 30 is positioned on the moveable frame 45. A transport mechanism (shown in detail in FIG. 5) is provided for driving moving frame 45 containing the light source 30 and the disk 15 in a direction substantially parallel to the substrate 20 in order to allow scanning of different regions of the substrate via said lens 10. In this case, the recommended position of the light source 30 is along the axis of the lens 10 at the time when its angle is centered on the substrate 20. As the lens 10 spins, the angular coverage required will be determined by half of the long dimension of the image divided by $Z_{source}$.

Figure 7:
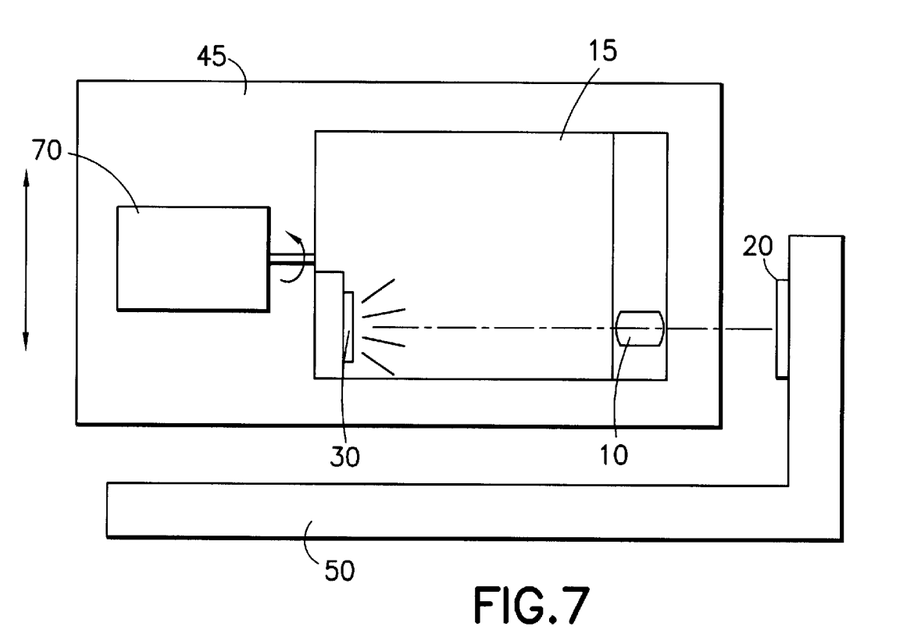
FIG. 7 shows a representative view of a further embodiment of the invention having a rotatable light source.

In a further embodiment shown in FIG. 7, the light source 30 spins with the disk 15 and is fixed in relation to the lens 10. In this embodiment, the disk contains the lens 10 and the light source 30. The disk is arranged on the moveable frame 45. A transport mechanism is provided for driving the moving frame 45 containing the light source 30 and the disk 15 in a direction substantially parallel to the substrate 20 in order to allow scanning of different regions of the substrate via said lens 10. This embodiment introduces the most complexity in any connections to the light source as well as increasing the mass of the spinner, but it removes the angle variations through the imaging lens and can sometimes be advantageous in achieving high optical performance by avoiding off-axis lens aberrations.

The light source in any embodiment may comprise multiple light sources. In many applications, multiple light sources may be required (three-color Red, green, Blue imaging being the primary example). Mounting the multiple light sources with small offsets from each other clustered around the preferred position described above will minimize but not eliminate the misalignment of the arcs traced by the image of each source. It will be necessary to calculate the path of each source and re-sample the data for each light source accordingly.

Additionally, the disk in any of the described embodiments may contain multiple lenses 10(see FIGS. 3 and 4). Since only a fraction of the rotation period of the spinner is practical for imaging (typically about 60 degrees out of 360), in some applications it may be useful to incorporate more than one lens 10 in the spinner. The number of scans across the image per rotation of the spinner as well as the overall percentage of active imaging time is multiplied by the number of lenses. The lenses 10 can be carefully matched to each other to eliminate variations from one to the next, or the small position errors from each lens can be factored into the data re-sampling process.

In a particular embodiment, the scanning lens 10 is part of an image recorder and the substrate 20 is a recording medium, such as film, the light source 30 comprises an imaging source. In such an embodiment the scanning lens 10 allows for exposure of the recording medium 20 to the radiation from the imaging source 30.

In a further embodiment, the scanning lens 10 is part of an input scanning device for image recording. In this embodiment, the substrate 20 contains an image and the scanning lens 10 scans the image on the substrate with radiation from the light source 30. Reflectance or transmittance from the substrate 20 is then measured by light detectors 5 in the conventional manner (FIG. 1).

Figure 8:
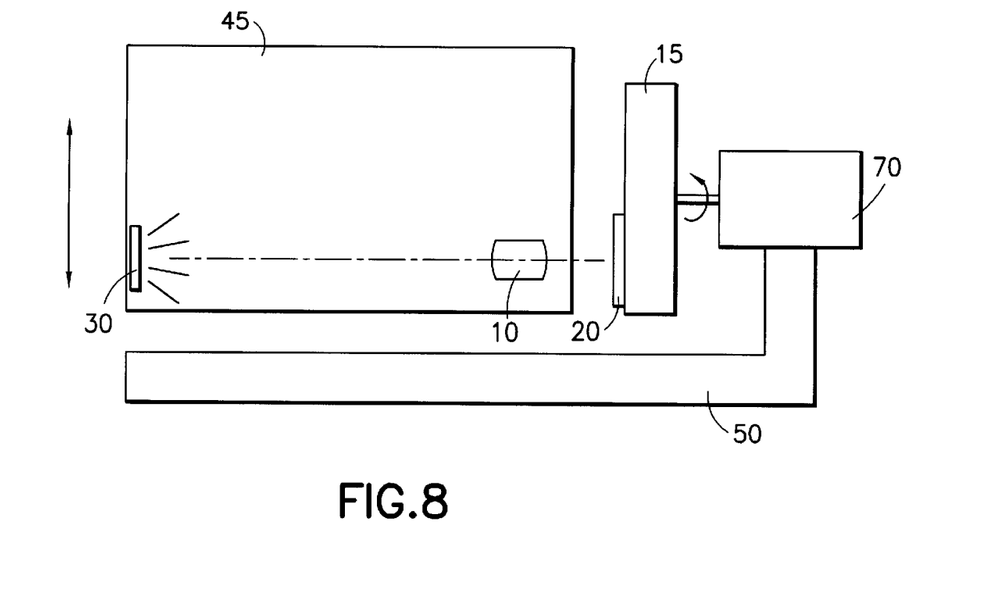
FIG. 8 shows a representative view of a further embodiment of the invention.

In a further embodiment of the invention shown in FIG. 8, the substrate 20 is affixed to a rotatable disk 15 and the scanning lens 10 and light source 30 are affixed to a moveable frame 45. The moveable frame 45 moves in a direction substantially parallel to the rotatable substrate 20 in order to allow scanning of different regions of the substrate 20 via said lens 10.

Although the invention has been described in connection with a preferred embodiment thereof, those skilled in the art will appreciate that numerous adaptations and modifications may be made thereto without departing from the spirit and scope is of the invention as set forth in the claims.

What is claimed:

1. An apparatus for scanning a substrate with radiation from a light source, comprising:
   a scanning lens arranged in proximity to said substrate for passing said radiation to said substrate, wherein said lens is arranged in a spinner which is rotatable about an axis normal to a flat scan plane of the substrate;
   a transport mechanism adapted for driving said spinner in a direction substantially parallel to the substrate in order to allow scanning of different regions of the substrate via said lens;
   a controller for coordinating the driving and rotation of said spinner to enable said substrate to be controllably scanned by radiation which passes through the scanning lens.

2. An apparatus in accordance with claim 1, further comprising a processor for converting the image data between a first format and a second format substantially corresponding to the path of a focal point of the rotating scanning lens over the substrate.

3. An apparatus in accordance with claim 2, wherein the first format of the substrate is a row and column raster format.

4. An apparatus in accordance with claim 1, wherein said spinner is a substantially opaque disk.

5. An apparatus in accordance with claim 1, wherein the light source comprises at least one of a light emitting diode, a laser, a fiber optic source, a cathode ray tube, an incandescent lamp, a xenon flash lamp, a xenon arc lamp, and a fluorescent lamp.

6. An apparatus in accordance with claim 1, wherein said controller controls said transport mechanism to provide progressive scanning of said substrate by said lens.

7. An apparatus in accordance with claim 1, wherein the lens scans the substrate in an arc which lies in a flat plane normal to the rotation axis of the lens.

8. An apparatus in accordance with claim 7, wherein the arc is traced by a focal point of the lens.

9. An apparatus in accordance with claim 8, wherein said transport mechanism is adapted to transport said spinner to allow exposure of subsequent arc regions of said substrate.

10. An apparatus in accordance with claim 1, wherein the light source is fixed in position relative to the scan plane.

11. An apparatus in accordance with claim 10, wherein the light source is arranged along an axis normal to the center of the substrate.

12. An apparatus in accordance with claim 1, wherein the light source tracks the movement of the spinner in a direction substantially parallel to the substrate.

13. An apparatus in accordance with claim 1, wherein the light source rotates with the rotation of the spinner.

14. An apparatus in accordance with claim 1, wherein multiple lenses are arranged in the rotatable spinner.

15. An apparatus in accordance with claim 1, wherein the light source comprises multiple light sources.

16. An apparatus in accordance with claim 15, wherein multiple lenses are arranged in the rotatable spinner.

17. An apparatus in accordance with claim 1, wherein:
   the substrate is a recording medium;
   the light source comprises an imaging source; and the scanning lens allows for exposure of the recording medium to the radiation from the imaging source.

18. An apparatus in accordance with claim 1, wherein:

the substrate contains an image; and the scanning lens scans the image on the substrate with radiation from the light source.

19. A method for scanning a substrate with radiation from a light source, comprising the steps of:

providing a scanning lens arranged in proximity to said substrate for passing said radiation to said substrate, wherein said lens is arranged in a spinner which is rotatable about an axis normal to a flat scan plane of the substrate;

driving said spinner in a direction substantially parallel to the substrate in order to allow scanning of different regions of the substrate via said lens; and coordinating the driving and rotation of said spinner to enable said substrate to be controllably scanned by radiation which passes through the scanning lens.

20. A method in accordance with claim 19, further comprising the step of converting the image data between a first format and a second format substantially corresponding to the path of a focal point of the rotating scanning lens over the substrate.

21. A method in accordance with claim 20, wherein:

the first format of the substrate is a row and column raster format.

22. A method in accordance with claim 19, wherein said spinner is an opaque disk.

23. A method in accordance with claim 19, wherein the light source comprises at least one of a light emitting diode, a laser, a fiber optic source, a cathode ray tube, an incandescent lamp, a xenon flash lamp, a xenon arc lamp, and a fluorescent lamp.

24. A method in accordance with claim 19, wherein said controller controls said transport mechanism to provide progressive scanning of said substrate by said lens.

25. A method in accordance with claim 19, wherein the lens scans the substrate in an arc which lies in a flat plane normal to the rotation axis of the lens.

26. A method in accordance with claim 25, wherein the arc is traced by a focal point of the lens.

27. A method in accordance with claim 26, wherein said transport mechanism is adapted to transport said spinner to allow exposure of subsequent arc regions of said substrate.

28. A method in accordance with claim 19, wherein the light source is fixed in position relative to the scan plane.

29. A method in accordance with claim 28, wherein the light source is arranged along an axis normal to the center of the substrate.

30. A method in accordance with claim 19, wherein the light source tracks the movement of the spinner in a direction substantially parallel to the substrate.

31. A method in accordance with claim 19, wherein the light source rotates with the rotation of the spinner.

32. A method in accordance with claim 19, wherein multiple lenses are arranged in the rotatable spinner.

33. A method in accordance with claim 19, wherein the light source comprises multiple light sources.

34. A method in accordance with claim 33, wherein multiple lenses are arranged in the rotatable spinner.

35. A method in accordance with claim 19, wherein:

the substrate is a recording medium;

the light source comprises an imaging source; and the scanning lens allows for exposure of the recording medium to the radiation from the imaging source.

36. A method in accordance with claim 19, wherein:

the substrate contains an image; and the scanning lens scans the image on the substrate with radiation from the light source.

37. A method for scanning a substrate with radiation from a light source, comprising the steps of:

providing a scanning lens arranged in proximity to said substrate for passing said radiation to said substrate, wherein said lens is arranged on a moveable frame;

providing a rotatable spinner adapted to hold the substrate, wherein said spinner is rotatable about an axis normal to a flat scan plane of the lens;

driving said moveable frame in a direction substantially parallel to the substrate in order to allow scanning of different regions of the substrate via said lens; and coordinating the driving of the moveable frame and the rotation of said spinner to enable said substrate to be controllably scanned by radiation which passes through the scanning lens.

\* \* \* \* \*